United States Patent [19]

Cronshaw et al.

[11] 4,110,823
[45] Aug. 29, 1978

[54] SOFT DISPLAY WORD PROCESSING SYSTEM WITH MULTIPLE AUTONOMOUS PROCESSORS

[75] Inventors: David Cronshaw, Torrance; Jack E. Shemer, Los Angeles; William D. Turner, San Marino; David Hartke, Pasadena; James R. Keddy, Huntington Beach; Wilbur E. DuVall, Victorville; Warren M. Sterling, Hermosa Beach, all of Calif.

[73] Assignee: Xerox Corporation, Stamford, Conn.

[21] Appl. No.: 769,594

[22] Filed: Feb. 17, 1977

[51] Int. Cl.² .................. G06F 15/20; G06F 3/14; G06F 13/00
[52] U.S. Cl. .................................................. 364/200
[58] Field of Search ... 364/200 MS File, 900 MS File

[56] References Cited

U.S. PATENT DOCUMENTS

| Re. 26,919 | 6/1970 | Hagelbarger | 364/900 |
|---|---|---|---|
| 3,564,509 | 2/1971 | Perkins | 364/200 |
| 3,653,001 | 3/1972 | Ninke | 364/200 |
| 3,949,375 | 4/1976 | Ciarlo | 364/200 |
| 3,973,244 | 8/1976 | Lovercheck | 364/200 |

*Primary Examiner*—James D. Thomas
*Attorney, Agent, or Firm*—James J. Ralabate; Sheldon F. Raizes; Leonard Zalman

[57] ABSTRACT

A distributed function processing system utilizing a conventional microprocessor operated as a text processor in combination with a plurality of other autonomous processing devices arranged to operate in a coherent processing system. One of the autonomous processors is a memory control processor which serves to periodically overlay a random access accelerator memory with the contents of a main memory system and concurrently resolves conflicts among various other autonomous memory service requests. This processor, therefore, accommodates the data rates of the main memory. The other processor is a display processor which generates signals to a video display system to provide a visual interface to the user and is therefore tied to the video rate. Accordingly, the processing burden is distributed within processors entailing differing rates operating autonomously. The memory control processor resolves and accommodates all of the memory service requests in the system and also performs control operations to support high speed I/O devices. Logic is provided to handle the other interrupts. Also, there is page mapping for context switching of a reference page and repeating logic for decoupling this processor from the other processors. This arrangement allows convenient expansion into plural work stations each sharing a common memory.

1 Claim, 10 Drawing Figures

SOFT DISPLAY WORD PROCESSING SYSTEM WITH MULTIPLE AUTONOMOUS PROCESSORS

BACKGROUND OF THE INVENTION

1. Field of the Invention

The present invention relates to data processing systems, and more particularly to a processing system comprising a plurality of heterogenous processors arranged to operate as a word processor.

2. Description of the Prior Art

In the recent past the advent of LSI circuitry has enabled wide use of low cost data processing devices commonly referred to as microprocessors. Most such microprocessors comprise a central processing unit, or a CPU, which in association with a primary memory, communicates with the outside world by way of input and output ports. While there has been improvement in the integration of the CPU and particularly in the switching time thereof, it is the integration of large scale memory chips that is the main element rendering such microprocessors possible. Typically, in the interest of fast access time, such memory elements take the form of a random access memory (RAM) and are thus directly addressable with an access time in the instruction time domain of the CPU. Thus, the memory access function became inherently compatible with CPU sequences and many control schemes previously performed by switching logic were converted to stored program form to be thus implemented in a microprocessor.

Semiconductor memory although now integrated extensively, is still relatively expensive for large data storage applications. Accordingly, most prior art systems utilize a secondary storage, usually much slower, for the on-line storage system. The primary storage then functions as an accelerator memory for active on-line data in order to better match the memory access rate with the CPU instruction rate.

In the past, there have been many techniques developed to accommodate this memory expansion function. Most such techniques, however, entail the use of the CPU as the servicing module through which the memory expansion is performed. Thus, during the execution of a particular instruction sequence involved in some logical process, interruptions would be periodically required for memory service. Adaptation of a microprocessor serving as a CPU to perform logical operations then becomes increasingly difficult as more use of secondary storage is required. Use of secondary storage becomes even more pronounced when microprocessors of this kind are combined to function in word processing systems.

Word processing, as now used in the art, is a term denoting automation of many services previously performed by a secretary. These functions when automated, however, require normally large main memory systems where functions like form letter preparation or standard paragraph insertion are exemplary in the volume of data storage that they require. Due to considerations of cost, data of this bulk is still best handled by serial secondary storage devices like Charge Coupled Devices (CCD), bubble memory, discs or magnetic tape.

One other feature particular to microprocessors is the handling of the input-output interfaces. In addition to memory expansion, microprocessors normally include as a central processing task the maintenance of the input and output ports. Since the CPU is a sequential device, the periods during which it maintains the interface are frequently referred to as interrupt periods during which no other operation can again occur. Thus, the undivided attention of the CPU alternates either to the problem operations or the servicing of input, output and memory. One typical output servicing function is for the display interface which normally requires a large servicing sequence. Typically the display is made by devices like a CRT which because of its physical constraints requires updating maintenance and which often require memory service to accommodate the amount of test normally displayed.

The above functions each relate to physical time constraints which encompass a very wide bandpass. On the low end the asynchronous real time inputs from the operator (e.g., keyboard stroke) entail program sequences which are not critical in their execution time. At the high end, the video display dictates very high data refresh rates fixed to the vertical and horizontal sync system of a CRT.

Heretofore most prior art systems attempted to accommodate these diverse requirements in a singular system which therefore entailed complex architecture and became quickly frozen in the amount of expansion or modification that can be achieved. Thus most such prior art systems either traded features for complexity or reduced the function complement of the system.

Word processing systems are best accommodated in work station clusters which may share a common memory. Where the memory is tied to a complex system structure expansion into additional work stations becomes increasingly difficult. For all of these reasons the system described herein is conformed in autonomous processing segments which therefore allow for convenient expansion of both the operating functions and the number of work stations forming a cluster.

SUMMARY OF THE INVENTION

It is therefore the purpose and object of the present invention to combine a plurality of heterogenous processors into one system serviced by a single main storage system.

Further objects of the invention are to provide a data processing system utilizing a plurality of processors where the failure of one processor only reduces system performance rather than producing a complete system shutdown.

Yet further objects of the invention are to provide a word processing system which integrates, on a logical priority basis, many processing requirements into one.

Briefly these and other objects are accomplished within the present invention by combining a microprocessor, such as the microprocessor made by the National Semiconductor Corporation, 2900 Semiconductor Drive, Santa Clara, Calif. 95051, under the Model Number IMP-16C, with two special purpose processors; one for the maintenance of a CRT display, and the other for the expansion of virtual memory and accommodation of direct memory access requests. For the purposes herein, the 16C microprocessor operates as the main processor and only as a result of its software are the other processors involved. The use of a commerical device at this critical junction is particularly advantageous because of the inherent reliability of mass produced items, cost advantages, and the standardized microcode utilized therein.

For purposes of clarity, the 16C microprocessor will be referred to herein as the test processor since this is the primary function embedded therein. Similarly the processing segments directed at maintaining and processing data for display will be referred to as the display processor. Lastly, the expansion of memory or the virtual memory operations together with block transfer I/O operations are carried out by a processor referred to as the memory control processor. The text, display, and the memory control processor are all connected to a main system bus; the text processor including an interface control unit for matching the commercial processor with the specially developed other parts of the system. In addition to these connections, the system bus also interfaces with various peripherals such as a head-per-track disc memory referred to herein as the microRAD, a set of replaceable or floppy discs, the input devices or keyboard, the hard copy output device or printer and a communication interface for common carrier or high speed local communication. Although reference is made above to a head-per-track disc main memory, other serial memories like the aforementioned CCD, bubble or any similar lower cost store is equally compatible with the system implemented herein. Thus a disc memory for storing the bulk or full repertoire of data and instructions necessary for a problem solution is exemplary only, all other stores being subsumed thereunder.

In more detail the system bus, which serves as the primary communication path between all of the processors involved in the system consists of an address bus, a data bus and a plurality of control lines. In addition to these lines above, there is a system clock line which serves as the basic system clock organizing the overall system. All bus data transfers are therefore synchronous with the system clock and the clock aperture sets the time interval within which the various bus leads must assume their proper binary value.

The address bus is 17 bits wide and the data bus is 16 bits wide, all leads thereof being assigned to carry the particular data word associated with the address. The remaining leads previously identified as the control lines in addition to the normal housekeeping functions, include 16 task request and acknowledge lines, the functions thereof being explained in more detail below.

This bus arrangement is capable of two distinct modes of opertion. In the first mode the text processor maintains all interrupt requests and services the various peripherals. The other mode of operation entails the use of the 16 task lines in conjunction with the memory control processor described in a copending patent application Ser. No. 769,611 entitled Memory Control Processor. As described in the copending system, various devices are combined, according to operations or tasks which are either more or less significant to the system. For example, any system fault diagnostics should be performed as closely as possible to the occurrence of the fault. On the other hand, tasks like idle or memory refresh are not critical in their timing and, therefore, can be performed at any convenient breakpoint in system operations. Between these two limits, the remaining tasks are distributed. Again, the distribution of these remaining tasks depends on the particular task timing and for example data transfer from a peripheral memory device which normally entails relatively slow transfer rates will have a lower priority than the memory write or the memory read tasks for the Text Processor.

The task priority table is couched in hard wired logic of a configuration analogous to that disclosed in U.S. patent application Ser. No. 769,254, filed Feb. 16, 1977 and entitled 'Task Handling In A Data Processing Apparatus', which is a continuation of U.S. patent application Ser. No. 518,679 assigned to the same assignee. This priority logic is contained in the front part of the memory control processor and the memory control processor therefore has absolute control over the bus system. In distinction over the prior application the presently disclosed task logic includes feedback elements by which the presently serviced task is latched out of the priority comparison. Thus during convenient breakpoints in a higher priority task lower priority requests will be serviced until they achieve breakpoint status.

Each task within the above logic entails a servicing sequence, similar to an interrupt operation of a microprocessor. The sequences each include breakpoints returning back to the task priority logic the control to service any other tasks occurring in the meantime. This breakpoint arrangement resolves previously irreconcilable conflicts, thus accommodating the various devices in the system which have different rates. Thus, the prior modes of interrupt processing has been modified in favor of a task switching sequence wherein each task being serviced is temporarily removed from priority consideration to make room for the next requesting priority.

The test processor itself is conventional in its mode of operation and therefore includes the conventional interrupt logic provided by the manufacturer. Without the use of the task logic in the memory control processor, the text processor can still service many of the interrupt requests from the peripherals in a conventional manner. Such, however, reduces the processing speed and efficiency of the system. In addition, the text processor includes a zero page mapping arrangement for context switching by which a particular page of memory is brought in according to the operating mode selected.

Functionally the text processor is assigned the low speed asynchronous input processing, as for example that originating at a keyboard. The cost of memory however is high resulting in a relatively small working store and therefore any bulk data operations necessarily entail data transfers between the lower speed main memory and the text processor itself. To provide for less costly working store, the memory control processor includes a random address page buffer store which the text processor can directly address. The page buffer store acts as the accelerating memory into which a large virtual memory is overlayed on demand. For that reason the memory control processor includes elements for carrying out the necessary memory overlays described in detail in said aforementioned application Ser. No. 769,611 filed on the same date herewith. Most of the external bus use in a system of this kind, and particularly in a system dedicated to operations like editing or text processing via a full-page display, is in the form of large memory transfers and a separate memory control processor is therefore assigned to organize the bus use. These functions are combined to form one integral system comprising autonomous modular subsystems each dedicated to a particular function. This modular approach, by function, greatly simplifies, the complexity of each module, allowing for convenient expansion of selected modules as need arises and reducing any checkout complexity.

DESCRIPTION OF THE SPECIFIC EMBODIMENT

While the foregoing illustration is set forth in the environment of word processing, such is for purposes of description only. It is to be noted that display word processing typifies one of the more difficult data processing operations, and the implementation of a data processing system adapted for such use will, therefore, accommodate many if not most other processing problems. It is therefore contemplated to present by way of this example one embodiment of a data processing system configured for one particular use, the analogical expansion thereof to uses other than those described being obvious to those skilled in the art. Accordingly, no intent to limit the scope of the invention by way of the choice of use selected is expressed.

Similarly, the implementation of the various subsystems disclosed includes integrated chip elements at various levels of integration. As will be obvious to those skilled in the art, other levels of integration are possible and the implementation selected is once more to be considered as exemplary only and not limiting.

SYSTEM DESCRIPTION

Figure 1:
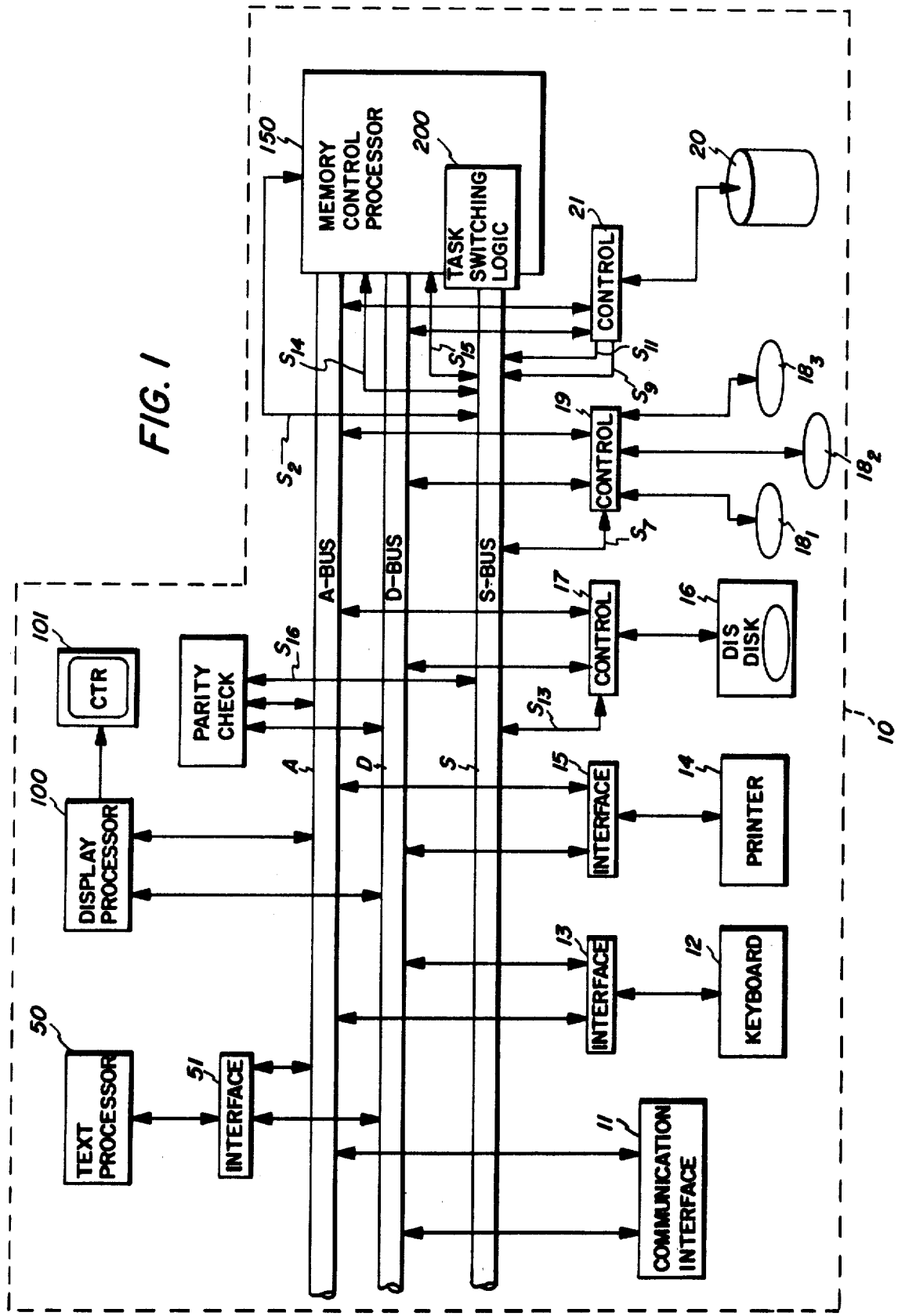
FIG. 1 is a general block diagram of a data processing system constructed to cooperate on the basis of the inventive features herein.

As shown in FIG. 1, a word processing system generally designated by the numeral 10 comprises a bus system including an address bus A, a data bus D and a system bus S. Buses A and B are conventional in their structure, including the necessary clock signals to organize system operations. Bus S, on the other hand, is a loosely organized set of signal leads connected to integrate the distributed functions of the present system and is identified as a bus for purposes of nomenclature only. Connected to the A and D buses are the various processing elements of the system. More specifically, a processor identified herein as a text processor 50 is tied across an interface stage 51 to buses A and D. Text processor 50 may be any conventional microprocessor and for the purposes herein the above identified microprocessor IMP 16C, made by National Semiconductor, can be utilized.

Also connected to buses A and D is a display processor 100 which, in turn, drives a cathode ray tube 101. Connected further to buses A and D is a memory control processor 150 which, by means to be further described, provides both the control over all bus traffic and expansion of virtual memory for the processing elements of the system.

Buses A and D are also tied to various other peripheral and input and output devices. Specifically, tied both to buses A and D is a communication interface 11 through which the present processing system can communicate with various other systems. Also connected to buses A and D is a keyboard 12 with its associated interface 13, a high speed printer 14, with its interface and control 15, an auxiliary magnetic storage system 16 with its associated control stage 17, a plurality of replaceable or floppy disc flies $18_1 - 18_3$ with their associated control 19 and a serial memory disc 20 (or other serial store) with its associated control 21.

This configuration of the system allows for a bimodal manner of operation where, for example, the text processor 50 may, in its conventional manner, directly service the interrupt sequences for either the keyboard 12, the printer 14, or the display processor 100. In a similar manner, i.e., by way of the interrupt sequence available in this commercial processor, the various memory devices can be brought in. In this mode, however, the relatively slow addressing speed of the various memory devices, i.e., disc 16, and floppy discs $18_1$-$18_3$ slow down significantly the operation of the text processor. Once addressed, the data rates from such memory devices are high, often higher than the cycle rate of the text processor. Similarly the main memory exemplified herein as a head-per-track disc or micro-RAD 20, while possibly at a speed higher than the text processor, often requires servicing processes not easily achieved in the text processor. The IMP 16C processor used as the text processor 50 includes volatile elements, which when tied to slow access memory devices, may die out before all of the data is captured and transferred. For this reason and to decouple the text processor from the other process rates the interface stage 51 includes repeating logic, to be described in more detail below, which is useful in the indirect mode of data transfer by maintaining, on a repeat basis, the memory requests of the text processor until any necessary memory overlays are completed in the memory control processor 150.

Thus the function of the system is to capture data as it appears, transform that data when necessary and to generate a response. The response, for example, may be in terms of a video display which, because of the fidelity and flicker rate, entails frequency levels as high as 60 MHZ. These rates are substantially higher than the cycle rate of the text processor. Similarly the data rates from the main memory may be higher than the corresponding cycle rate of the text processor. In each instance, separate processors are provided, the memory control processor 150 being described in said aforementioned Ser. No. 769,611 and the display processor being described in U.S. patent application, Ser. No. 769,596, filed on the same date herewith and entitled, "Display Processor." It is these processors that decouple the asynchronous, operator initiated, inputs handled by the text processor from the hardware fixed time constraints.

It is for this purpose that the system includes the S bus which, in turn, is tied to a task switching logic section 200 which is structured as an improvement to the architecture described in the aforementioned application Ser. No. 769,254 and which is located at the front of the memory control processor 150.

The S bus, similar to buses A and D, is tied by signal double strand leads $S_1 - S_{16}$ to the various peripherals, each peripheral providing a particular service request designated by the subscript R to the logic section 200 and receiving a corresponding acknowledge signal designated by the subscript A on the same lead when the task is completed. It is therefore to be understood that leads $S_1 - S_{16}$ are dual strand leads for the purposes herein, having a separate request and acknowledge path.

Task Switching Logic

While the general functions of logic 200 are similar to that described in the referenced application, and furthermore are described in said aforementioned application Ser. No. 769,611, the present system entails operations involving task switching and a summary discussion of this task switching logic is therefore taken up herein.

Figure 2:
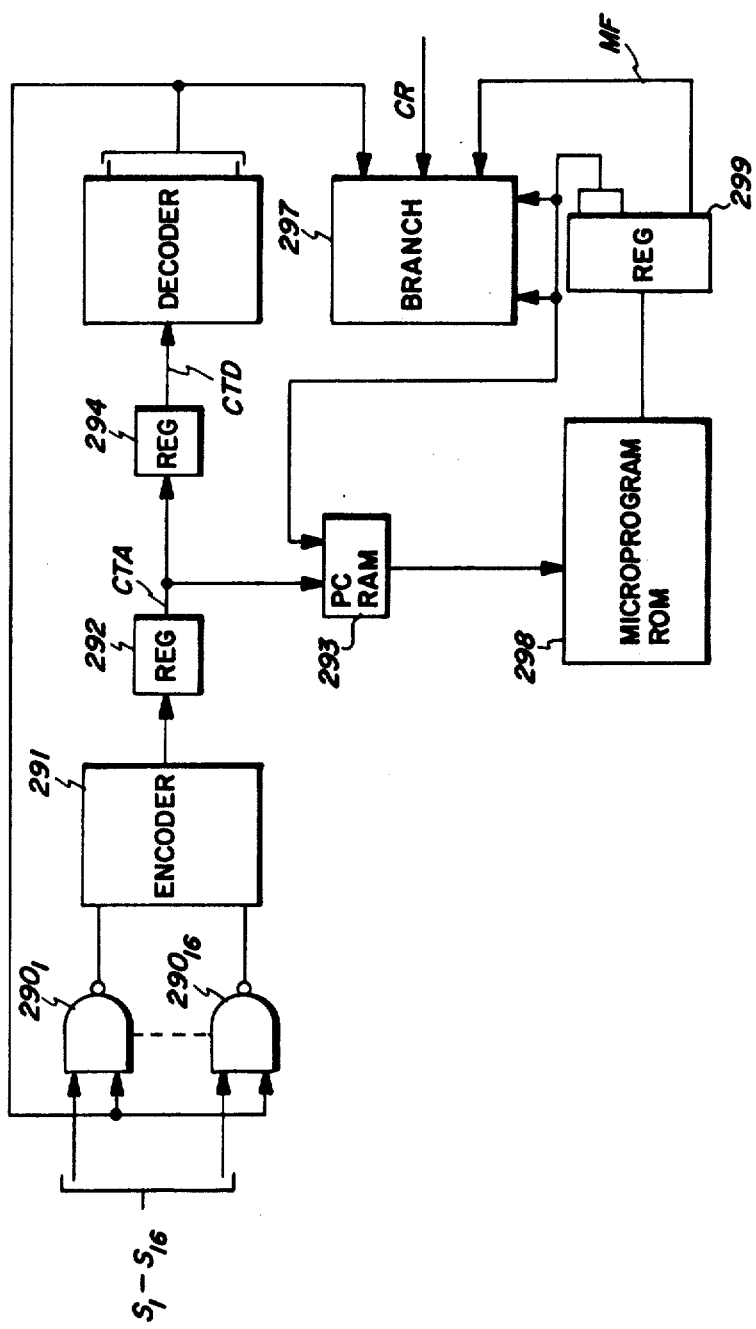
FIG. 2 is a block diagram of a task priority logic system constructed according to the present invention.

As shown in FIG. 2, the task control logic section 200, in general breakdown, comprises an encoder stage 291 which at a plurality of input NAND gates $290_1 - 290_{16}$ receives a set of signal leads $S_{1R} - S_{16R}$ from bus S, each identifying a particular task request, and converts such to a priority code which is applied to a register stage 292. Register stage 292 provides the current task address (CTA) which is applied to a program counting memory stage (RAM) 293 and to a delay register stage 294. Register 294 produces an output CTD (Current Task Delayed) which is decoded by a decoder stage 295. The outputs of decoder 295 are then returned in the form of signals $S_{1_A} - S_{16_A}$ to the gates $290_1 - 290_{16}$ at the input of stage 291. By way of this feedback arrangement the currently serviced task is inhibited from the next priority consideration. Thus the first breakpoint occurring in the serviced task will defer to the next higher priority then requesting. The signals CTA from register 292 select the address in the RAM 293 into which the sequence of instruction addresses are loaded. These instruction addresses select a particular field in a ROM 298. ROM 298 outputs into a register 299 the sequential code of the servicing sequences in 48 bit wide code words, thus operating as the microprogram store.

During the execution of any one servicing sequence part of the register 299 output is returned to RAM 293 which, in combination with a branch stage 297, allows the programmer flexibility over the servicing microprograms. Furthermore, signals $S_{1_A} - S_{16_A}$, code combination MF from register 299 and a signal CV to be described, control the branch stage 297. RAM 293 therefore stores the address code for the instructions in ROM 298 which can be resumed at the end of each break.

Memory Control Processor

With the foregoing description of the task priority logic section 200, the organization of the memory control processor 150 will now be taken up. It is to be noted that the technique expanding the working memory from three storage levels is the subject matter of the aforementioned patent application entitled "Memory Control Processor," filed of even date, and any detailed considerations of the processor 150 will necessarily entail consideration of this referenced application. Accordingly, the following description will deal with the structure shown in FIG. 3 which presents the memory control processor 150 only to such an extent as is necessary to complete the description of the present system, reference to be made to said aforementioned application Ser. No. 769,611 for the details thereof.

Figure 3:
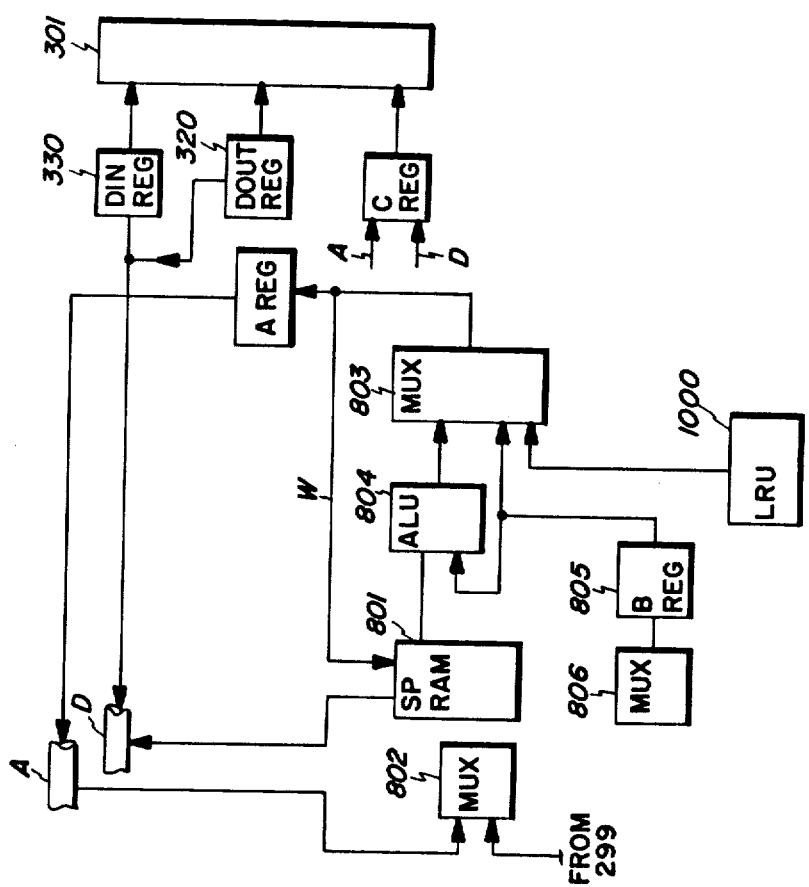
FIG. 3 is a block diagram of a memory control processor useful with the operation of the inventive features herein.

As shown in FIG. 3, the memory control processor 150 comprises a random access accelerator store section, referred to herein as the page buffer store, system 900 a controller stage 800 and an overlay system implemented herein according to a Least Recently Used access algorithm and therefore denominated as an LRU system 1000. The choice of the LRU algorithm is a specific implementation, but overlays are controllable by any logical algorithm. Within the controller stage 800 a scratch pad RAM 801 is provided having a plurality of fields some of which operate to store the next instruction address in the priority unit 200 (i.e., the address of the code emanating from the instruction register 299) while some others being assigned and shared for external service such as service of the floppy disc system $18_1 - 18_3$. The address input to RAM 801 is obtained from a multiplexer 802 tied to select either the contents of bus A or the output of register 299. Thus the address to the scratch pad memory 801 is either direct from the text processor 50, for example, or as a function of the task execution cycle. The data input to memory 801 is through a local bus W which originates at a multiplexer 803 collecting and selecting between the outputs of the overlay or RLU logic 1000, an arithmetic logic unit (ALU) 804, and a B-register 805. Register 805, in turn, stores the output of a multiplexer 806, bus D or bus A where multiplexer 806 receives the A, D and W buses while the ALU 804 completes the loop by collecting the output of memory 801 and the B-register 805. The controller 800 outputs from memory 801 into bus D (across appropriate bus drivers) and across an A-register 809 from multiplexer 803.

The foregoing arrangement provides for a broad and flexible system which can be selectively configured to any desired mode by the control inputs to the various multiplexers and the ALU.

Buses A and D, furthermore, input to a C-register 310 in the page buffer system 900, register 310 being once again controlled by the code appearing on the PB control outputs of the instruction register 299. To respond only to certain PB codes the control input to register 310 is produced by a controller 311, decoding the PB code and thus configured as a decoder or filter of particular bit combinations. The C-register 310 then provides the appropriate address input to a random access accelerator store or page buffer store 301 which is coupled in the data read and write connections to a data outregister 320 and a data register 330, both of which are tied to bus D.

It is therefore the function of the page buffer store 301 to provide an accelerator function to the external bus system. To achieve this function various lower level memory contents are promoted and demoted in and out of the page buffer store according to acceptable overlay algorithms in the overlay system 1000. The implementation of one such overlay scheme is carried out more extensively in said aforementioned application Ser. No. 769,611 reference should be made thereto for further details.

DISPLAY PROCESSOR

The present system includes a display processor 100 driving a CRT display 101. While in many data processing applications the immediate display of data is not generally necessary, most interactive uses dictate some visual communication with the operator. In word processing, in particular, the ability to provide a soft display of the text which is then edited or otherwise manipulated by the user is critical if one is to avoid repetitive production of hard copy as each document is organized. Although particularly suited for such word processing, the integration of a video display, however, is advantageous in other uses and the present system includes the provisions for such a display.

Processing of characters alone, however, is often insufficient in view of the other potential uses of the system. Accordingly, in addition to a character generation feature, the display processor includes a facsimile section thus being capable both of text and graphical display.

Figure 4:
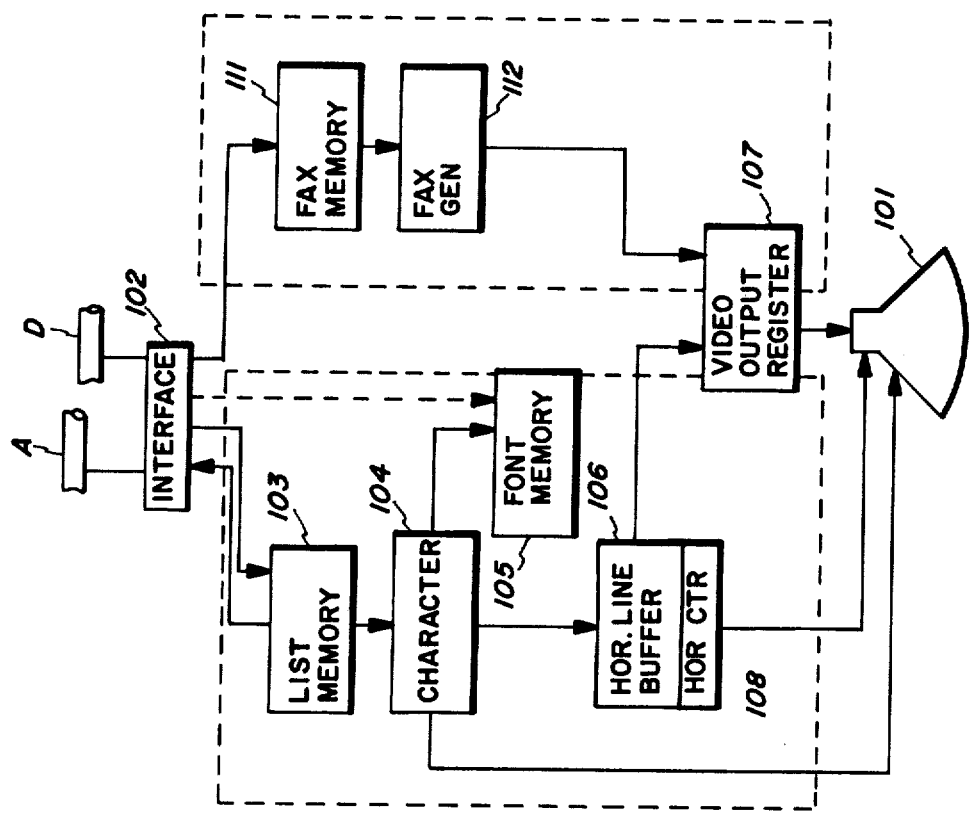
FIG. 4 is a generalized arrangement of a display processor adapted for cooperative use with the inventive features disclosed herein.

A generalized layout of a display processor useful herein is shown in FIG. 4, it being understood that such is illustrated for completeness only. While there are various implementation techniques in the interest of generality only gross functions are shown. As shown in FIG. 4, the display processor 100 communicates with buses A and D across an interface state 102. Interface 102, loads, in coded form, both the text characters and the various display control instructions into a list memory 103 which accumulates a serial list of characters and operations necessary to fill out the screen of the CRT 101. For this purpose, the list memory is approximately 8 K bytes large, such capacity being necessary to accomodate a typical 8½ × 11 inch document. Tied to the list memory 103 is a character generator 104 and an associated font memory 105, the latter providing the dot matrices for the various characters displayed. Thus the text characters are fed to the display processor 100 in coded form, such as the ASCII code which is converted to dot format by the font memory 105. These dot arrays are then returned to the character generator 104 to be serially brought out into a line buffer 106 connected to control a video output register 107. Associated with the horizontal line buffer 106 is a horizontal counter 108 providing the horizontal deflection signal to the CRT 101. The vertical deflection signal, in turn, is originated at the character generator 104 during the line-by-line raster separation of data for the line buffer 106.

In a similar manner, facsimile data is impressed on to buses A and D in compressed code format which is expanded by a facsimile memory 111 and applied to a facsimile generator 112. Generator 102 then provides a parallel signal to the output register 107, in synchronism with the vertical and horizontal deflection signals. Thus all of the video processing, including display refresh, deflections, blanking and other functions operates totally independent from the system busses. The only data exchange is by way of inputs to the list memory 103 and fax memory 111 which can occur at any rate used by the overall system.

Also shown by way of a dashed signal lead is a direct path between interface 102 and the font memory 105. This provides for a loading path for the dot patterns forming characters in a font. Alternatively ROM's may be used as memory 105, further simplifying system architecture. It is to be noted that the display processor 100 further reduces the processing load in the system by automatically calculating character displacement, once more, according to data in memory 105.

Again, it is necessary to note that the foregoing description of the display processor 100 is on the general level only. The operative features of the present invention can function without the assistance of a display processor, by way of the printer provided.

BUS SYSTEM

Figure 5:
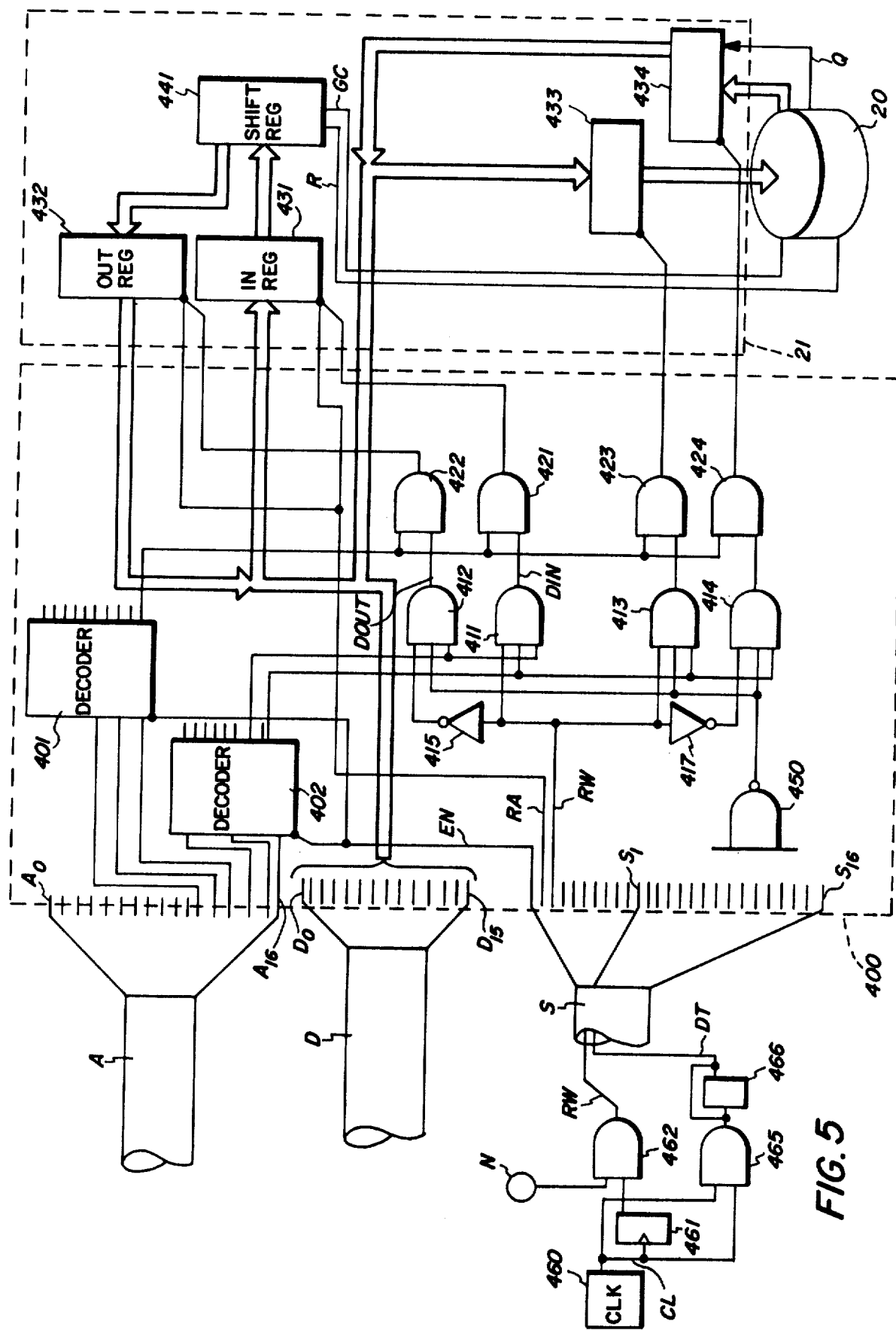
FIG. 5 is a logic diagram of an inventive interface system constructed according to the present invention.

With the foregoing descriptions of the various processing elements which are tied to a common bus, the implementation of the bus system and the various controls associated therewith will now be taken up. As shown in FIG. 5, bus A comprises 17 lines of address, labeled as lines $A_0 - A_{16}$. Bus D includes 16 lines, again labeled as lines $D_0 - D_{15}$. In the above description of the present system 10, the various devices are shown tied to the bus system across separate interface devices (e.g. interfaces 13 and 15, and controls 17, 19, and 21). This implementation, while functionally correct, would entail redundancy in the bus architecture, and therefore in physical arrangement contains many instances of shared logic.

Thus, the bus system is shown to include a common interface section 400 to which the various interfacing devices are tied. The interface section 400 selects the particular device addressed, identifies the operation (order) which is to be performed in combination with the selected device, and otherwise organizes bus performance. Thus the A bus, for example, is shown tied by bit leads $A_{11} - A_{13}$ to a 3-line-to-8-line decoder 401, such as the decoder built by Texas Instruments, under the model No. SN74155. Decoder 401 then provides 8 discrete lines each identifying a particular device. Bus leads $A_{14} - A_{16}$ are tied to a similar decoder 402 which identifies the operation to be performed by the device selected. In order to separate this direct input-output operation from the task associated operations, the S bus includes a gating lead EN tied to the chip enable terminals of decoders 401 and 402 which, when high, distinguishes this operation from indirect operations involving the MCP 150.

When enabled decoder 401 selects a particular device by setting one of the eight outputs high; concurrently, the encoder 402 selects the operation. Since there are many instances where similar operations are performed by the various devices selected, a common preassigned code is utilized throughout. Thus, by reference code appearing on the input leads tied to encoder 402, i.e., leads $A_{14} - A_{16}$ the following order table is provided:

| $A_{14}$ | $A_{15}$ | $A_{16}$ | | |
|---|---|---|---|---|
| 1 | 1 | 0 | = | device addressed by encoder 401 to load D bus contents onto its data receiving register |
| 1 | 1 | 1 | = | device addressed by encoder 401 to load its command register with contents of D bus |
| 0 | 0 | 0 | = | Reset device |
| 1 | 1 | 0 | = | selected device to load (output) its data register onto D bus |
| 1 | 1 | 1 | = | selected device to load status code onto D bus |

From the above list, it is apparent that at least the 110 and 111 order codes appear in two directions. Thus, an additional control lead RW is included in bus S to control the direction. This signal is tied directly to an AND gate 411 and across an inverter 415 to an AND gate 412. Gates 411 and 412, therefore, control the direction of data transfer between the selected device and bus D.

These control signals, identified as signals D-in and D-out, are in turn collected in the selected interface circuit at corresponding AND gates 421 and 422 with the device selecting lead from decoder 401. Gates 421 and 422, in turn, each enable a corresponding in-register 431 and out-register 432 which are connected in parallel to the bit leads $D_0 - D_{15}$ in bus D.

It is necessary to note that gates 421 and 422, and the corresponding registers they control are repeated in each interfacing device. Thus, the D-in and D-out signal will be fanned out to as many interfacing devices as are included in system 10. Each interfacing device, however, besides these common elements will include the specific structure dictated by the peripheral device. Accordingly, by way of example, the architecture of controller 21 is shown connected therewith, it being understood that all the other interfaces are similarly connected. Again, by reference to FIG. 5, registers 431 and 432 also comprise the front section of controller 21. The output of register 431 is parallel loaded into a shift register 441 which in the data load or in mode is shifted by the gear clock (sector) signal GC of the main memory disc 20. During this time, the data word loaded from bus D is serially shifted onto the disc on lead R. In the out mode data is serially loaded from disc 20 onto the same register 441, again by the disc gear clock, and is output into register 432.

As has been previously stated, the selection of registers 431 or 432 is under the control of decoder 402 and the state of signal RW. Since the operations involved are the device data in and out operations corresponding to a 110 code at the input to decoder 402, this operational mode is selected by the second highest lead thereof which is concurrently applied to gates 411 and 412.

Two additional operations occur in this exemplary interface. For example, when decoder 402 identifies a command operation directing disc 20 to perform certain operations the output of this decoder corresponding to an input code 111 is applied to two AND gates 413 and 414 which also respectively collect signal RW, gate 414 receiving this signal across an inverter 417. The outputs of gates 413 and 414 are, in turn, collected with the device selection decoder 401 output in yet another pair of AND gates 423 and 424, gate 423 enabling a command register 433 and gate 424 enabling a status register 434. The registers receive and transmit the respective status and command codes of the disc 20.

In addition to the above connections, the discrimination between a direct peripheral access and an access entailing task servicing is also accommodated by the circuit 400. More specifically, the return signals developed by the decoder 295 in FIG. 2 are also collected at the input of a NAND gate 450, the output thereof being applied in common to gates 411-414. Thus, any time a task request is raised the device selection encoder 401 and operation encoder 402 are inoperative.

With the foregoing physical description of the controller, certain operation sequences will now be taken up. Typically, any commands to a rotating store have to occur in some synchronism with the sector intervals thereof. A command code on bus A is first decoded by decoder 402 and essentially gated by signal RW. This coincidence loads the command register 433. Register 433 may comprise two registers, one to receive the command code and the other to control the disc 20. The transfer between these registers will occur at the next sector pulse, shown as signal Q, to thus synchronize the command timing with the disc.

In an alternative mode, the operation of the section 400 may be bypassed by a signal RA which therefore will allow direct in and out transfers to the disc. This is accomplished schematically by connecting signal RA from the bus A to the chip enable terminals of registers 431 and 432.

The other interface and control circuits are similarly implemented and are disclosed in detail in the following pages.

BUS TIMING

All bus communications on busses A and D are organized by way of a bus system clock. By reference to FIG. 6, a clock 460 is shown generating a pulse train CL at a rate of approximately 175 nanoseconds, a rate compatible with the processing rate of the commercial processor included in the text processor 50. The clock signal CL is connected to a flip-flop 461 configured as a divide-by-two flip-flop circuits which drives one terminal of an AND gate 462. Gate 462 also receives a request signal N from the communication device attempting to make direct access to the bus system. Signal N, in combination with the output of flip-flop 461, thus provides the command or order aperture signal RW which is entered into bus S. This same signal aperture then permits the selection of the receiving device, shown herein as controller 21 by the address leads $A_{11} - A_{13}$. The timing relationship of these signals is such that signal N extends through several periods of signal CL. The RW signal is, however, started by the leading edge of one of the clock pulses within this aperture and continues for two clock cycles. It is to be noted that the clock periods identified herein as periods $T_1 - T_n$, are complete clock cycles. On the second clock cycle, after signal RW is turned on a signal DT is turned on. This signal, in FIG. 5, is generated by yet another AND gate 465 and a divide-by-two flip-flop 466 and is conveyed by bus S to strobe registers 431 or 432, for example.

A similar timing relationship set up for the indirect communications, i.e., bus communications entailing the above referenced task sequences. Again, by reference to FIG. 5, a requesting device may raise any one of the task request signals $S_1 - S_{16}$. If any one is so raised, the bus control logic (comprising section 400) is essentially disabled by the NAND gate 450. Concurrently the requesting task line is applied to the task priority logic circuit 200 which resolves any conflicting task requests. By reference back to FIG. 2, the decoder stage 295 and the looping back around the register stage 292 provides a feed back, or acknowledge, feature shown by leads $S_{1_A} - S_{16_A}$. Thus, the outputs from decoder 295 are brought back to the sending device as acknowledge signals once the task is initiated. It is only during this acknowledge period, or during the times that the priority decoder is latched in to a particular task servicing sequence, that any suppression of other bus traffic is necessary. Accordingly, while shown with reference to signals $S_1 - S_{16}$, the operation of gate 450 is on the return signals only and such has been so identified by the labels $S_{1_A} - S_{16_A}$.

Figures 6, 7:
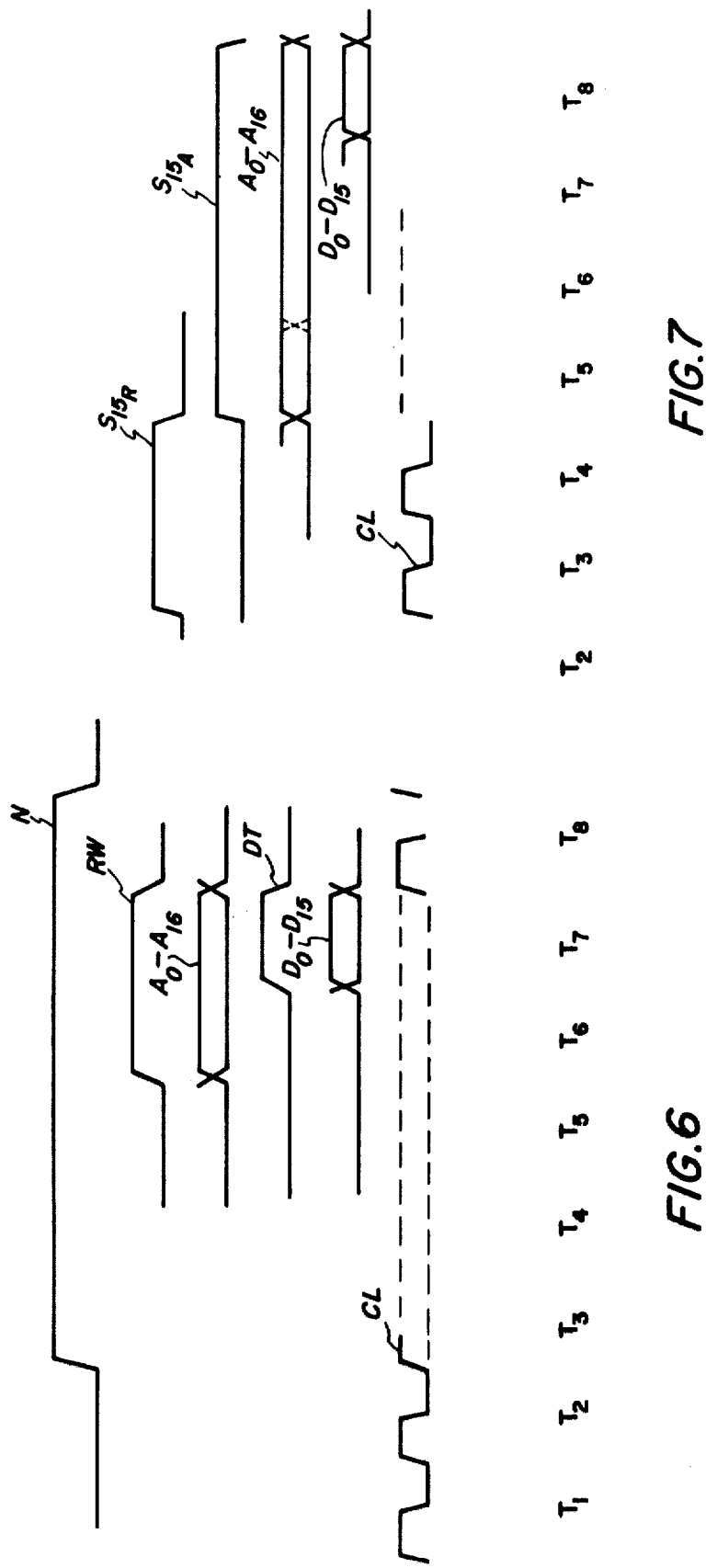
FIG. 6 is a timing diagram of the external bus system utilized herein.
FIG. 7 is yet another timing diagram of the external bus system utilized herein.

The corresponding timing sequence is shown in FIG. 7. As shown in this figure, a task request signal ($S_{15_R}$ for example) is followed by its acknowledge signal $S_{15_A}$. This signal opens the aperture for the A bus. Signal $S_{15_R}$ is a memory read task request and the address on bus A is therefore a virtual memory address. During this address aperture, several clock cycles are necessary for any mapping sequences used in extending memory. Thus, the data on the D bus ($D_0 - D_{15}$) is transferred close to the end of the address cycle.

In the direct transfer mode to page buffer store 301 (FIG. 3) only a short address pulse is necessary, the page buffer address being latched in by the C-register 310. Thus, the hashed trailing edges of the address signal in FIG. 7 identify the real address transfers.

REPEATING LOGIC

Since most memory requests will originate in the text processor 50, and will sometimes entail access to data not currently in the accelerator store 301 it is necessary to modify the operation of the commercial text processor to accommodate any overlay requirements. Reference should therefore be made to FIG. 8 where the interface 51 is illustrated including this modification.

Furthermore, concurrent reference should be had to said aforementioned application Ser. No. 769,611 wherein some of the signals entailed in the overlay sequence are set forth. To complete the present description unit 1000 in FIG. 3 is shown to provide a signal CV which indicates whether the requested address has been brought up to the accelerator store 301. To this extent, any cross referencing or mapping system can accommodate this function. Without loss of generality the address format may be real, virtual or transformed, the preference herein being to an address coordinate system referenced to the main memory or micro-RAD 20 where most data is to be found. If the same data is in the accelerator or page buffer store 301 unit 1000, in addition to the CV signal, provides the necessary transformation. Also at the conclusion of the overlay or any other task the memory control processor develops a "try again" signal TRY indicating that a new task may be taken up.

Figure 8:
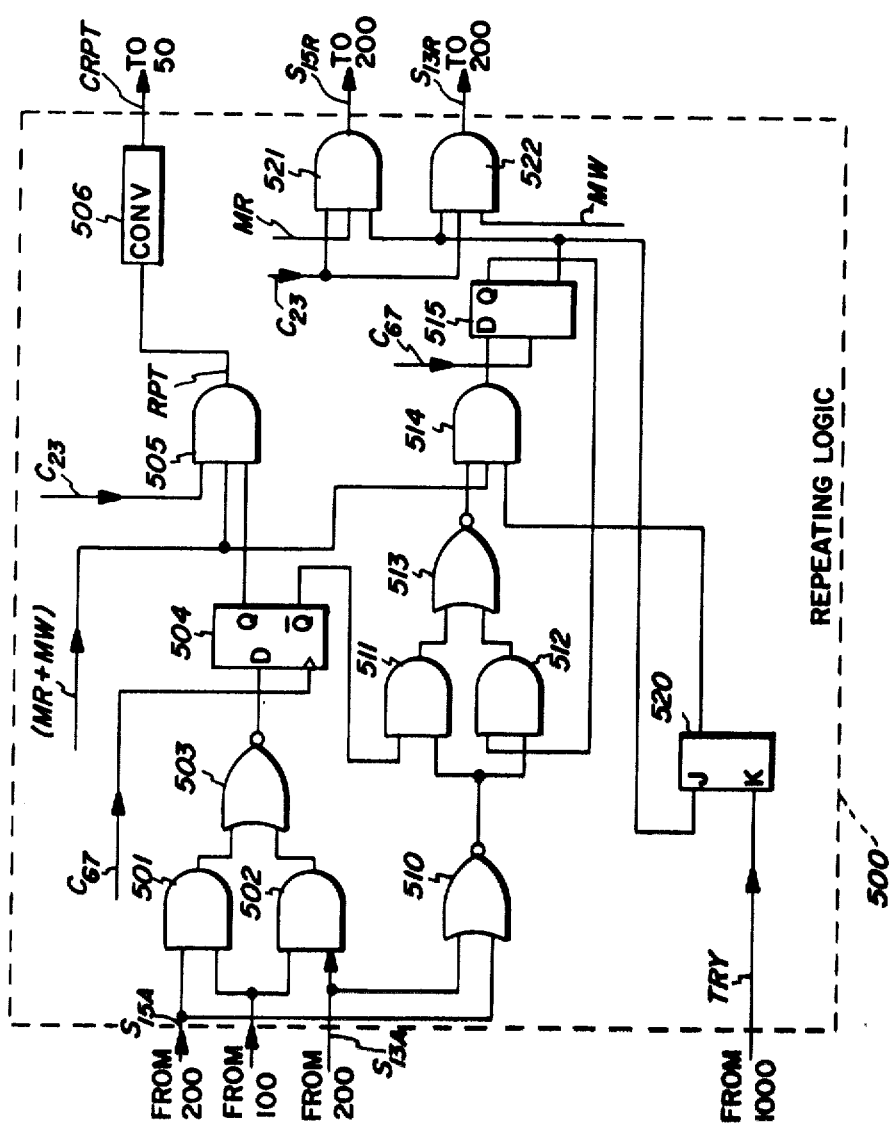
FIG. 8 is a logic diagram of a repeater stage constructed according to the present invention for combining a commercial processor with the system disclosed herein.

To implement these functions interface 51 includes a repeating stage 500 illustrated in FIG. 8. It is to be noted that additional logic is required for the various housekeeping functions such as memory refresh and TTL to MOS conversion. Furthermore all address space is implemented by way of a 16 bit bus A and therefore any address expansion features must also be accommodated in the interface stage. These requirements are particular to the configuration selected and furthermore can be conveniently accommodated by various bus expansion techniques and are therefore left to the particular choice of a designer.

In stage 500 signals $S_{15_A}$ and CV are collected at the input of an AND gate 501 while the same signal CV is also received together with the $S_{14_A}$ signal in an AND gate 502. Gates 501 and 502 are collected in a NOR gate 503 which controls the D terminal of a D-flip-flop 504. Thus if either the $S_{14_A}$ or $S_{15_A}$ signals and the CV signal are high the output of gate 503 will be low raising the $\overline{Q}$ output of flip-flop 504 at the next clock input shown herein as a signal $C_{67}$. Alternatively the Q output is high to be collected with the text processor memory service request signals (shown herein as a collected signal MR + MW indicating either a Memory Read Or Memory Write request) and a timing signal $C_{23}$ in an AND gate 505 to generate a repeat command signal RPT. Signal RPT is converted from TTL to MOS level by a converter 506 to produce a MOS logic signal CRPT which raises the signal identified LOCSH in the IMP 16C microprocessor to recycle the CROM (Control ROM) to repeat the execution cycle.

Thus as long as the output of gate 503 is high the flip-flop 504 requests repeats of the memory service requests by pulling up the particular signal in the text processor. Only when the request is acknowledged and the contents of memory 301 are correct will this repeat sequence be disabled.

Similarly signals $S_{14_A}$ and $S_{15_A}$ are collected in a NOR gate 510 which then drives one of the inputs in two AND gates 511 and 512. Gates 511 and 512, in turn, drive a NOR gate 513, gate 511 collecting the $\overline{Q}$ signal from flip-flop 504 while gate 512 collects a looping signal to be described. Again gate 513 will go low if any of the outputs of gates 511 and 512 are high. The output of gate 513 is collected with signal MR + MW and a Q signal to be described in an AND gate 514 which drives the D terminal of a flip-flop 515 clocked by signal $C_{67}$. The Q output of flip-flop 515 connects to the input of gate 512 while the $\overline{Q}$ signal controls the J terminal of yet another flip-flop 520 which at its K input receives the signal TRY. It is the Q output of this flip-flop that is collected in gate 514.

Thus gate 514 operates as a low level OR to turn off flip-flop 515. The $\overline{Q}$ output of this last flip-flop gates two AND gates 521 and 522 which respectively receive the MR and MW signals, combined above, to produce the memory request signals $S_{14_R}$ and $S_{15_R}$ at a time controlled by signal $C_{23}$.

Figure 9:
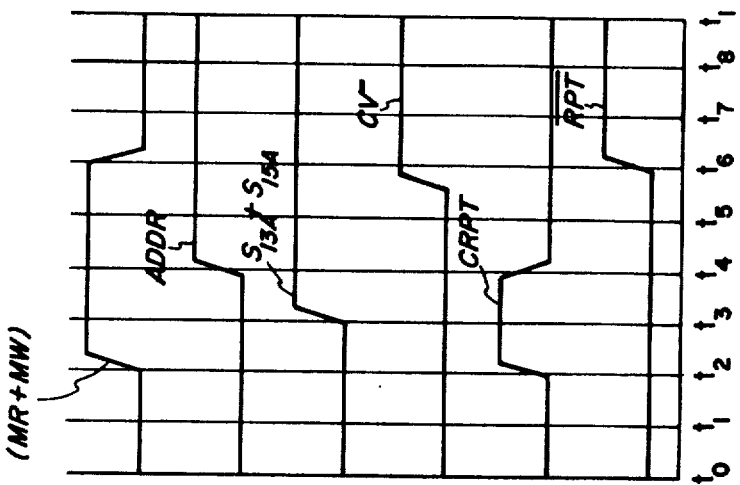
FIG. 9 is a timing diagram of a set of selected signals entitled in the operation of the repeating logic shown in FIG. 9.

The foregoing illustration can be further explained by reference to FIG. 9. As shown in this figure, the execution cycle of the IMP 16C processor is 8 clock periods wide, labeled $t_1 - t_8$. The memory read or memory write MR + MW instruction start at the $t_1$ to $t_2$ transition and continue for several cycles. Approximately two cycles later the address code ADDR is impressed on bus A. Concurrently, if no other tasks are being executed, the corresponding acknowledging signals $S_{14_A}$ or $S_{15_A}$ are issued from unit 200. This requires at least one clock period. If the data is in memory 301 then, at some later time in the execution cycle, the signal CV is returned. Since neither task acknowledgment nor proper overlay are known within the first cycle, signal CRPT will always be produced once. Only at time $t_6 - t_7$ (corresponding to signal $C_{67}$) is the flip-flop 504 clocked to turn on its $\overline{Q}$ output shown herein as $\overline{RPT}$. Thus on the next cycle the CRPT signal is inhibited by this flip-flop to enable the requested data transfer.

It is to be noted that signals $C_{23}$ and $C_{67}$ are timing aperture signals developed within the text processor 50 at times $t_2$ and $t_3$ and $t_6$ and $t_7$ respectively. Various other timing arrangments are possible, however, the main restriction being in the relative times between signals CV, $S_{14_A}$, $S_{15_A}$ and the corresponding MR and MW signals. Again signals MR and MW are signals generated by the text processor 50 and to that extent are fixed by the timing imposed therein.

TEXT PROCESSOR AND SYSTEM OPERATION

With the foregoing description of parts associated with the inventive system 10, the operation will now be set forth. As has been previously stated, the text editing and file manipulation program sequences are carried out in the text processor 50 which in this instance includes a commercial microprocessor such as the IMP-16C processor made by the National Semiconductor Corporation and extensively documented by publications. Reference should therefore be made to publications like the IMP-16C Application Manual, National Semiconductor Corporation, 1974 for the various details thereof, and the following discourse is therefore limited to only such details as are necessary to set forth the present invention.

Figure 10:
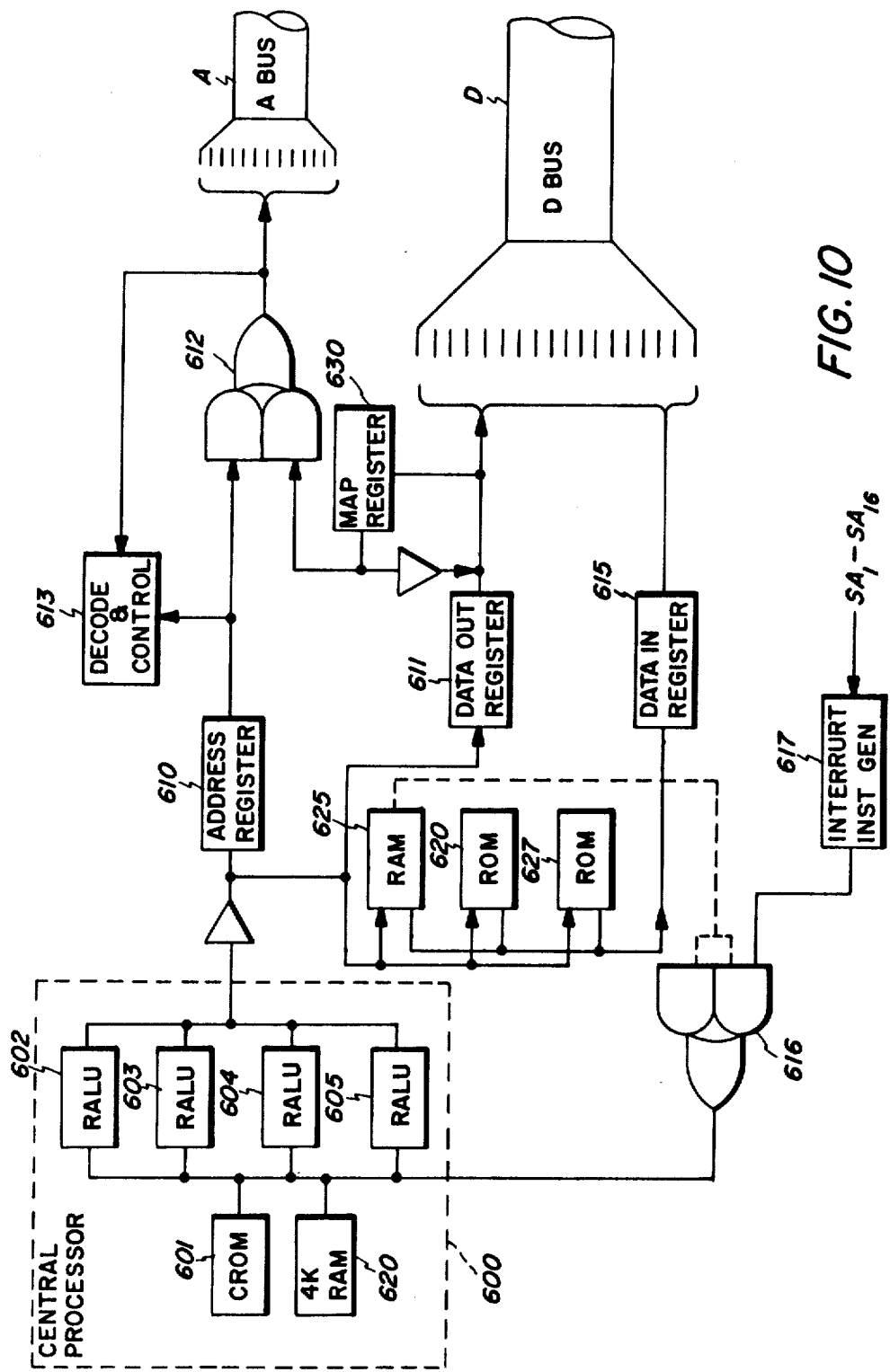
FIG. 10 is a generalized diagram of a commercial processor useful herein.

Briefly, as shown in FIG. 10, the text processor 50 includes the commercial IMP-16C microprocessor shown generally by the block 600, schematically including a control ROM (CROM) 601 and four, four bit, register and arithmetic logic units (RALU) 602–605 connected in parallel to form a 16 bit wide path. It is this CROM 601 that is pulled into a repeat mode by the signal CRPT. The parallel output from RALU's 602–605 is connected to an address register 610 and a data out register 611. Register 610, in turn, connects to the A bus across an AND/OR circuit 612 and as one input to a decoder and control circuit 613. The output connections of circuit 612 provide one other input path to the decoder 613 which, on the basis of these signals, controls the transfer across circuit 612.

In a similar manner, the data is transferred from bus D into an in-register 615 which at its output is received in yet another AND/OR circuit 616. One other input to circuit 616 is the output from a vectored interrupt register 617 which generates a jump-to-subroutine instruction in 16C code in response to any of the task acknowledge signals $S_{1_A} - S_{16_A}$. Thus, each task request is treated by the text processor 50 as an interrupt where the subroutine is handled by some outside processing device.

In addition to these functions, the text processor 50 includes the necessary local memory shown as a 4K RAM 620 in the central processor 600 and a start up memory system comprising a RAM and two ROM's 626–627. These last devices accommodate, in a conventional manner, the start up sequence of the system where the 4K RAM 620 and the page buffer store 301 are used conjunctively as a directly accessed memory system. As is implicit in any start up sequence, no virtual memory expansion processes are possible at this time; the memory control processor 150 is therefore essentially inoperative during start up. The function of ROM's 626 and 627 in this mode, therefore, provides for the loading sequence of microcode data from the floppy discs 18₁ – 18₃ to the page buffer store 301, for example, to start up of virtual memory or of the MCP system.

There is also included a 9 bit mapping register 630 operating on the output of register 611 which re-maps one page of the memory into any desired location. More specifically, the most significant nine bits of input to the address bus A are returned to the decoder 613. If these bits are all zero (i.e. indicating page zero in memory) a signal R is produced to the inputs of the AND/OR circuit 612 which will then select the outputs of the MAP register 630 to be impressed onto bus A. Map register 630, in turn, is loaded under program control with nine bits of binary code from the output of the data out register 611. The nine bits of output of register 630 are furthermore returned, through a program controlled inverter bank 631 (shown symbolically as a single inverter), as an input to register 615. Inverter 631 and the map register 630 are controlled by the same signal R and will therefore respond only when a zero page (most significant nine bits of bus A are zero) is involved.

This feature allows for a convenient storage of reference programs or data pertinent to each operation. In this manner any convenient storage location can be selected for each sequence which can be then brought out by the addressing of the page zero. This arrangement of parts ties the commercial microprocessor into the system. While functionally more pertinent to the overall system structure, the in, out, and address register arrangement provides the organization of the text processor 50 and is therefore shown as a part thereof and not as a part of the interface 51.

It is to be noted that the foregoing implementation refers to a single text processor 50. Without any increase in system hardware more than one text processor (with one or more associated printer keyboards and displays) can be connected to the bus system allowing for plural work stations each serviced by the same memory system. This further reduces system cost by distributing cost of memory and processing logic over several work stations.

With the above exemplary implementations of the various devices tied to the system 10, a data processing system combining a commercial processor with other heterogenous devices is set forth. The organization of the system is such that one processor, i.e., the text processor 50 maintains the program sequence while most interrupt sequences are handled by the MCP 150. This sets an organization for the use of the system bus while at the same time reducing the program load in the main processor.

Some of the many advantages of the present invention should now be readily apparent. As one example, the invention provides for interrupt control outside of a commercial processor allowing for integration of large system ensembles without overloading the main processor operations. Furthermore various autonomous peripherals are accommodated on an optimized basis in priority logic which is flexible in its use and in its program modification.

Obviously many modifications and variations to the above disclosure can be made without departing from the spirit of the invention. It is therefore intended that the scope of the invention be determined solely on the claims appended hereto.

We claim:

1. A data processing system adapted for text editing comprising:
   an external bus system;
   a text processor including a memory portion, said text processor being coupled to said bus system, said text processor receiving input signals from said bus system and producing at a first cyclic rate predetermined command signals in response to said input signals;
   a semi-autonomous memory control processor coupled to said bus system, said memory control processor including a main memory and an accelerator memory for storing data signals and instruction signals, said main memory periodically advancing at a second cyclic rate data therefrom to said accelerator memory in response to receipt by said memory control processor of selected ones of said command signals;
   isolating means connected between said text processor and said bus system and responsive to signals received from said memory control processor for decoupling said text processor from the communications on said bus system during the times when said memory control processor is advancing said data signals and instruction signals from said main memory of said memory control processor to said accelerator memory of said memory control processor;

a semi-autonomous display processor coupled to said bus system, said display processor including a video display means and a list of memory means independent of said memory portion of said text processor, said list memory having signals stored therein and being responsive to selected other ones of said command signals and said video display means being rendered cyclically operative independent of said selected other ones of said command signals for producing images of characters and graphics at a third cyclic rate according to the signals stored in said list memory; and at least one data input device coupled to said bus system, said data input device being coupled through said external bus system to said memory portion of said text processor and utilizing as its memory said memory portion of said text processor.

* * * * *